(12) United States Patent
Hori et al.

(10) Patent No.: US 6,817,024 B2
(45) Date of Patent: Nov. 9, 2004

(54) METHOD OF FIXING A LASER DIODE TO AN OPTICAL BASE AND OPTICAL PICKUP USING THE OPTICAL BASE

(75) Inventors: Ken'ichi Hori, Kawasaki (JP); Tsukasa Yamada, Sagamihara (JP); Hisamichi Sekine, Sagamihara (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 270 days.

(21) Appl. No.: 10/218,120

(22) Filed: Aug. 13, 2002

(65) Prior Publication Data
US 2003/0058607 A1 Mar. 27, 2003

(30) Foreign Application Priority Data
Aug. 21, 2001 (JP) ........................................ 2001-250115

(51) Int. Cl.⁷ .............................. G11B 7/09; G11B 7/12
(52) U.S. Cl. ...................................... 720/681; 361/600
(58) Field of Search ................................ 720/658, 681, 720/674; 361/600; 369/112.01, 244, 249

(56) References Cited

U.S. PATENT DOCUMENTS 5,815,483 A * 9/1998 Iizuka ........................ 369/244
6,631,302 B1 * 10/2003 Wilson ........................ 700/59
2001/0050899 A1 * 12/2001 Ito et al. ..................... 369/253
2003/0021220 A1 * 1/2003 Yamauchi et al. ........... 369/249
2003/0043728 A1 * 3/2003 Kan et al. ................... 369/244

FOREIGN PATENT DOCUMENTS

| JP | 3-250428 | * 11/1991 |
|---|---|---|
| JP | 9-251663 | * 9/1997 |
| JP | 10-162398 | * 6/1998 |
| JP | 11-213422 | * 8/1999 |
| JP | 11-242147 | * 9/1999 |

* cited by examiner

*Primary Examiner*—David L. Ometz
(74) *Attorney, Agent, or Firm*—Frishauf, Holtz, Goodman & Chick, P.C.

(57) ABSTRACT

In order to fix a laser diode 12 to an optical base 11, a plurality of threaded pins 15 are at first fixed to the optical base by the use of, for example, an anaerobic adhesive. Then, the laser diode is faced to the optical base in an area between the threaded pins. The laser diode is adjusted in position and angle with respect to the optical base by, for example, 5 axes 3D adjustment. Thereafter, the laser diode is fixed to the threaded pins by the use of solder pieces 16.

9 Claims, 2 Drawing Sheets

METHOD OF FIXING A LASER DIODE TO AN OPTICAL BASE AND OPTICAL PICKUP USING THE OPTICAL BASE

BACKGROUND OF THE INVENTION

This invention relates to a method of fixing a laser diode to an optical base and to an optical pickup using the optical base.

As a recording medium for use with an electronic apparatus such as a personal computer, a CD-R (compact disc recordable) and a CD-RW (compact disc rewritable) are known. The CD-R is a recording medium which allows an additional writing operation to be repeatedly carried out. The CD-RW is a recording medium which allows a rewriting operation to be repeatedly carried out. Each of the CD-R and the CD-RW is compatible with a CD-ROM (compact disc read only memory), an audio CD (CD-DA) (compact disc digital audio), a DVD-ROM (digital versatile disk read only memory), and a DVD-RAM (digital versatile disk random access memory). Writing into the CD-R or the CD-RW requires a special apparatus and a writing application program. On the other hand, reading from the CD-R or the CD-RW can be executed by an ordinary CD-ROM drive. In the present specification, the CD-R, the CD-RW, the CD-ROM, the audio CD, the DVD-ROM, and the DVD-RAM may collectively be called an optical disk.

In order to write and read data into and from the optical disk, an optical pickup is used. The optical pickup of the type comprises a laser diode for emitting a laser beam and an optical system for directing the laser beam to the optical disk. Typically, the laser diode and the optical system are fixed to a common optical base.

Existing methods of fixing the laser diode are classified into first through third methods (1)–(3) as follows.

(1) To simply fit the laser diode to the optical base.
(2) To provide the laser diode with a flange and to adjust only angles of the laser diode in several directions (in many cases, only in a horizontal direction).
(3) To position the laser diode by 5 axes 3D adjustment know in the art and to fix the laser diode by the use of an adhesive.

However, the first through the third methods mentioned above have disadvantages which will be described below. In the first method, it is possible to provide a pickup which is simple in structure and low in cost. However, it is difficult to improve the positional accuracy of the laser diode. The second method is excellent in heat release because heat is diffused via the flange. However, this method requires a complicated mechanism so that the adjustment of the laser diode in multiple directions is difficult and a large space is required. The third method is excellent in fixing accuracy but is poor in heat release. Therefore, this method is not suitable for a high-output laser diode.

SUMMARY OF THE INVENTION

It is therefore an object of the present invention to provide a method of fixing a laser diode to an optical base, which is capable of easily improving a positional accuracy of the laser diode, which can be implemented by a simple structure, and which does not inhibit heat release.

It is another object of this invention to provide an optical pickup which Is high in positional accuracy of a laser diode, which is simple in structure, and which is excellent in heat release.

Other objects of the present invention will become clear as the description proceeds.

According to an aspect of the present invention, there is provided a method of fixing a laser diode to an optical base. The method comprises the steps of screwing and fixing a plural number of threaded pins to the optical base, facing the laser diode to the optical base in an area between the threaded pins, adjusting a position and an angle of the laser diode with respect to the optical base, and soldering and fixing the laser diode to the threaded pins. The above-mentioned steps are sequentially carried out in this order.

According to another aspect of the present invention, there is provided an optical pickup which comprises an optical base, a plural number of threaded pins screwed and fixed to the optical base, a laser diode faced to the optical base in an area between the threaded pins and adjusted in position and angle with respect to the optical base, and a soldering portion fixing the laser diode to the threaded pins.

DESCRIPTION OF THE PREFERRED EMBODIMENT

Description will be made about a method according to the present invention with reference to the drawings.

Figure 1:
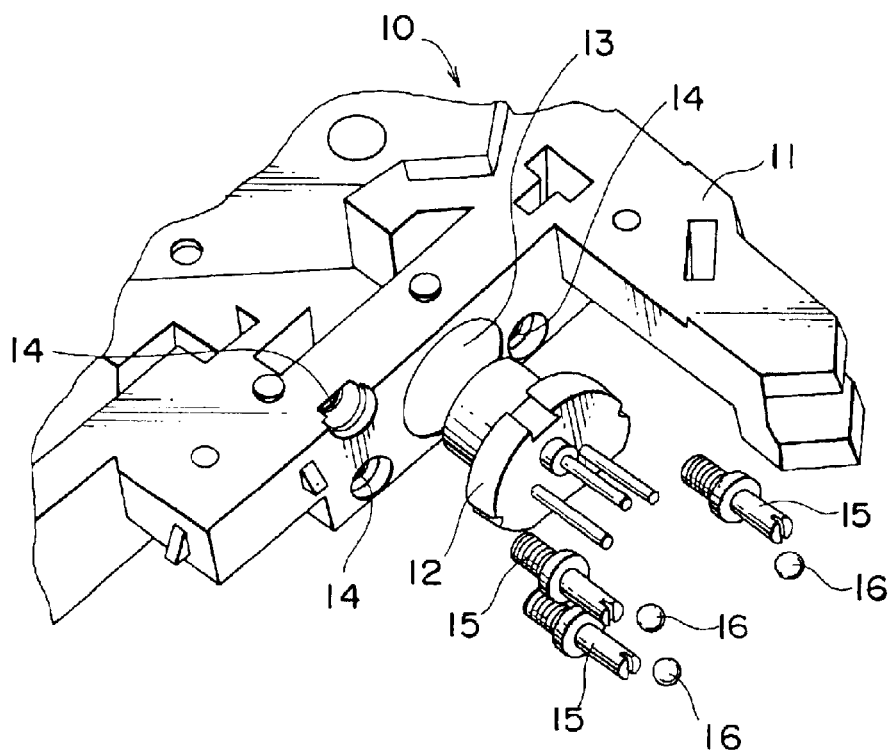
FIG. 1 is a perspective view of a part of an optical pickup before a laser diode is fixed to an optical base.

At first referring to FIG. 1, an optical pickup 10 having an optical base 11 made of metal is illustrated in the state before a laser diode 12 is attached to the optical base 11. The optical base 11 is provided with a fitting hole 13 formed at a predetermined position to receive a part of the laser diode 12 fitted thereto. The optical base 11 has three thread holes 14 formed at three angularly spaced positions around the fitting hole 13.

In order to fix the laser diode 12 to the optical base 11, three threaded pins 15 made of metal and solder pieces 16 corresponding to the threaded pins 15 are used. Each of the solder pieces 16 is made of a solder known in the art. In the figure, three spherical solder pieces 16 are illustrated. However, it will readily be understood that the shape and the number of the solders are not restricted.

Figure 2:
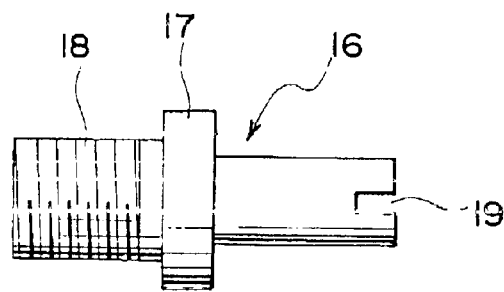
FIG. 2 is a side view of a threaded pin illustrated in FIG. 1.

As shown in FIG. 2, each of the threaded pins 15 has a flange 17 formed at an intermediate position in a pin axis direction, a thread portion 18 formed on an outer periphery of a part between the flange 17 and one end in the pin axis direction, and a minus groove 19 formed at the other end in the pin axis direction. The thread portion 18 is adapted to be screwed into the thread hole 14 of the optical base 11. The flange 17 is a portion to be brought into contact with the optical base 11 when the thread portion 18 is engaged with the thread hole 14. The minus groove 19 is a portion to be engaged with a tool (not shown) for operating or driving the threaded pin 15.

Turning back to FIG. 1, before the laser diode 12 is attached to the optical base 11, the thread portion 18 of the threaded pin 15 is screwed and fixed to the thread hole 14 of the optical base 11. At this time, an anaerobic adhesive is interposed between the threaded pin 15 and the optical base 11. Thus, the threaded pin 15 is securely adhered and fixed to the optical base 11. Because the adhesive is anaerobic, the threaded pin 15 will not be loosened even if the external force is applied or even after lapse of a long time.

Next, the laser diode 12 is faced to the optical base 11 so that a part of the laser diode 12 is fitted to the fitting hole 13 of the optical base 11. Then, the laser diode 12 is placed at an optimum position and oriented at an optimum angle by 5 axes 3D adjustment.

Figure 3:
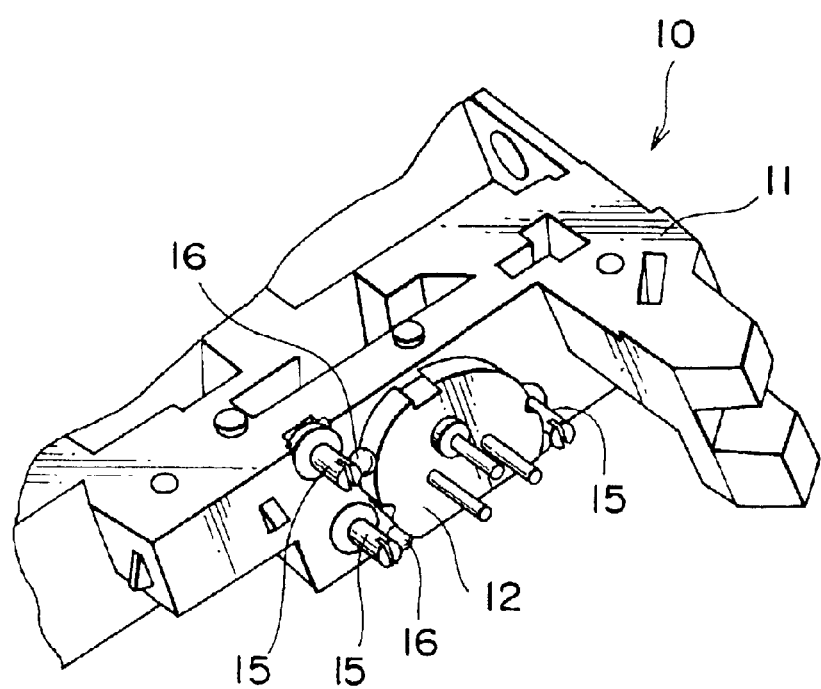
FIG. 3 is perspective view similar to FIG. 1 but after the laser diode is fixed to the optical base.

Thereafter, as shown in FIG. 3, each of the solder pieces 16 is interposed between a metallic peripheral surface of the laser diode 12 and each of the threaded pins 15. By predetermined heating, soldering is carried out. As a consequence, the laser diode 12 is securely fixed to the optical base 11 at the optimum position and at the optimum angle.

With the above-described structure, even if the laser diode generates heat, the heat is diffused from the laser diode 12 through the threaded pins 15 to the optical base 11. Thus, the laser diode 12 is prevented from being heated to a high temperature. Therefore, even in a case of a high-output laser diode, no problem will occur.

Since the above-mentioned method can be implemented simply by using the three threaded pins 15, the increase in cost can be suppressed.

Moreover, since the method requires only the three threaded pins as additional components, the space-saving effect is achieved. Therefore, this method is applicable to a pickup used in a thin-profile drive for driving the optical disk.

In the foregoing description, the metallic threaded pins 15 are used. Preferably, the threaded pins 15 are preliminarily subjected to highly-solderable plating, for example, copper plating.

On the other hand, the laser diode 2 is preferably subjected to highly-solderable plating, for example, iron plating, at least on its peripheral surface.

It will readily be understood that this invention is not restricted to the above-described embodiment but may be modified in various other manners within the scope of this invention. For example, the three threaded pins 15 are used in the above-described embodiment. However, it is possible to implement the method by the use of at least two threaded pins.

What is claimed is:

1. A method of fixing a laser diode to an optical base, comprising the steps of:

screwing and fixing a plural number of threaded pins to the optical base;

facing the laser diode to the optical base in an area between the threaded pins;

adjusting a position and an angle of the laser diode with respect to the optical base; and soldering and fixing the laser diode to the threaded pins, the above-mentioned steps being sequentially carried out in this order.

2. The method according to claim 1, further comprising the step of adhering each of the threaded pins to the optical base by the use of an anaerobic adhesive.

3. The method according to claim 1, wherein the adjusting step is performed by 5 axes 3D adjustment.

4. The method according to claim 1, wherein each of the threaded pins is subjected to highly-solderable plating.

5. The method according to claim 1, wherein the plural number is at least three, the threaded pins being arranged around the laser diode.

6. An optical pickup comprising:

an optical base;

a plural number of threaded pins screwed and fixed to the optical base;

a laser diode faced to the optical base in an area between the threaded pins and adjusted in position and angle with respect to the optical base; and a soldering portion fixing the laser diode to the threaded pins.

7. The optical pickup according to claim 6, wherein each of the threaded pins is adhered to the optical base by the use of an anaerobic adhesive.

8. The optical pickup according to claim 6, wherein each of the threaded pins is subjected to highly-solderable plating.

9. The optical pickup according to claim 6, wherein the plural number is at least three, the threaded pins being arranged around the laser diode.

* * * * *